United States Patent
Kawasaki et al.

[11] Patent Number: 6,045,357
[45] Date of Patent: Apr. 4, 2000

[54] CONTINUOUS SINTERING PLANT INTEGRATED WITH GLOVE BOX FOR MAINTENANCE USE

[75] Inventors: Takao Kawasaki, Naka-gun; Shigenori Aono, Hitachinaka; Mitsuaki Kato, Mito, all of Japan

[73] Assignee: Japan Nuclear Cycle Development Institute, Ibaraki, Japan

[21] Appl. No.: 09/297,838

[22] PCT Filed: Sep. 21, 1998

[86] PCT No.: PCT/JP98/04237

§ 371 Date: May 10, 1999

§ 102(e) Date: May 10, 1999

[87] PCT Pub. No.: WO99/16083

PCT Pub. Date: Apr. 1, 1999

[30] Foreign Application Priority Data

Sep. 22, 1997 [JP] Japan .................................. 9-275168

[51] Int. Cl.$^7$ .................................................. F27B 9/02
[52] U.S. Cl. ................................ 432/128; 266/255; 432/3
[58] Field of Search .................................. 432/3, 13, 128, 432/191, 207, 208, 217, 218; 266/249, 255, 280, 283

[56] References Cited

U.S. PATENT DOCUMENTS 3,708,157  1/1973  Aubry et al. .......................... 432/128
4,047,886  9/1977  Heyraud ................................ 432/128
5,607,296  3/1997  Wadekamper ............................ 432/3

Primary Examiner—Mark Paschall
Assistant Examiner—Gregory A. Wilson
Attorney, Agent, or Firm—Wenderoth, Lind & Ponack, L.L.P.

[57] ABSTRACT

A continuous sintering apparatus to be used for sintering nuclear fuel pellets includes a casing integrally constructed to have an upper portion enclosed in a maintenance glove box. The furnace casing includes a casing body and a ceiling cover removably mounted on the casing body, and the ceiling cover can be opened in the glove box while retaining containment. A furnace member to be accommodated in the casing body comprises a combination of a plurality of divided furnace member units, and the furnace member units can be maintained by glove operations when they are delivered from the inside of the casing body into the glove box. A ceiling crane is disposed at an upper portion of the inside of the glove box, and a ceiling cover tentative space and a maintenance working space are provided in the glove box. A turntable for placing the delivered furnace member unit is preferably disposed in the maintenance working space.

4 Claims, 2 Drawing Sheets

CONTINUOUS SINTERING PLANT INTEGRATED WITH GLOVE BOX FOR MAINTENANCE USE

TECHNICAL FIELD

The present invention relates to a maintenance glove box integrated type continuous sintering apparatus by which it is possible to deliver a united furnace member from the inside of a furnace casing of a continuous sintering apparatus and to perform all maintenance operations by glove operations by enveloping the upper portion of the furnace casing in a maintenance glove box and by opening a ceiling cover of the furnace casing. This technique is useful for an apparatus requiring containment such as a fuel pellet sintering apparatus for conducting a nuclear fuel producing process.

BACKGROUND OF THE INVENTION

In the apparatus for sintering the fuel pellets in the nuclear fuel producing process, it is necessary to maintain or retain containment for handling a nuclear fuel substance. The continuous sintering apparatus of the prior art is made to have a joint structure in which the furnace casing can be divided into a plurality of (e.g., three or so) blocks. By sandwiching O-rings or the like between the individual furnace casing blocks, gas-tightness is maintained. Moreover, an entrance glove box and an exit glove box are connected to the two ends of the furnace casing. The entrance glove box and the exit glove box are connected at the two ends of the furnace casing to maintain containment by O-rings and flanges.

The ordinary sintering operations are performed by the following procedure. The pellets to be sintered are delivered on a dedicated truck from a preceding step to the entrance glove box to pass through the furnace casing while being carried on a tray. During this passage, the pellets are subjected to a sintering treatment. The sintered pellets are then sequentially delivered out to the exit glove box and transferred on a dedicated truck to a succeeding step.

The use of such a sintering apparatus for a long period of time causes damage or deterioration of the furnace members in the furnace casing such as heaters or insulating bricks. At a periodic interval or at occurrence of problems, therefore, the furnace casing or furnace members have to be inspected, repaired or replaced. In order to repair or replace the furnace members such as the heaters or the insulating bricks, however, the furnace casing blocks have to be separated, and the containment cannot be maintained during separation of the furnace casing blocks.

Therefore, in the maintenance method of the prior art, a greenhouse (i.e., a simple facility such as a tent which is enveloped with a vinyl sheet so as to maintain gas-tightness between the inside and outside and is bound at a suitable site to a metal frame so as to keep its shape) is installed around the continuous sintering furnace, so that a worker wearing protective clothing such as a flight suit enters the greenhouse to perform the necessary operations. More specifically, when the furnace member is to be replaced, the furnace casing blocks are jointed at first with a furnace casing block separating vinyl bag, and the furnace casing block to be maintained is separated and subjected to the maintenance operations in the greenhouse.

Thus, in the prior art, it is necessary to install the greenhouse around the continuous sintering furnace and to equip the greenhouse with an exhaust system for maintaining a negative pressure. This necessity enlarges the facilities required for maintenance and causes a problem that it takes a long time to install or remove the greenhouse. As a result, a wide space is required for the installation, and the sintering apparatus have to be shut down for a long period of time for maintenance and repair.

Moreover, the worker has to enter the greenhouse to perform the operations while wearing protective clothing, and the furnace casing blocks have to be jointed with cylindrical vinyl bags so that they may be separated. This raises a problem that the operations are complex and take a long time.

DISCLOSURE OF THE INVENTION

An object of the invention is to provide a continuous sintering apparatus by which it is possible to execute maintenance operations in a short period of time and in an easy manner by glove operations without the necessity of installing a greenhouse.

According to the invention, there is provided a maintenance grove box integrated type continuous sintering apparatus, in which a casing of a continuous sintering furnace is integrally constructed to have an upper portion enclosed in a maintenance glove box, and the furnace casing includes a casing body and a ceiling cover removably mounted on the casing body, and the ceiling cover can be opened in the glove box while maintaining or ensuring containment. A furnace member to be accommodated in the casing body comprises a combination of a plurality of divided furnace member units, and the furnace member units can be maintained by glove operations when they are removed by opening the ceiling cover from the inside of the casing body into the glove box. As a result, it is possible to improve maintainability and to minimize the time period for stopping the sintering apparatus for maintenance and at the occurrence of problems.

Each of the furnace member units includes a cylindrical cage enveloping the outer side, insulating bricks and heaters enveloped by the cage. Moreover, the plurality of furnace member units are so arrayed inside of the furnace casing as to have their center axes aligned.

A ceiling crane is disposed at an upper portion of the inside of the glove box. A ceiling cover tentative space for placing the removed ceiling cover tentatively and a maintenance working space are provided in the glove box, and a turntable for receipt of the delivered furnace member unit is preferably disposed in the maintenance working space.

BEST MODE FOR CARRYING OUT THE INVENTION

Figure 1:
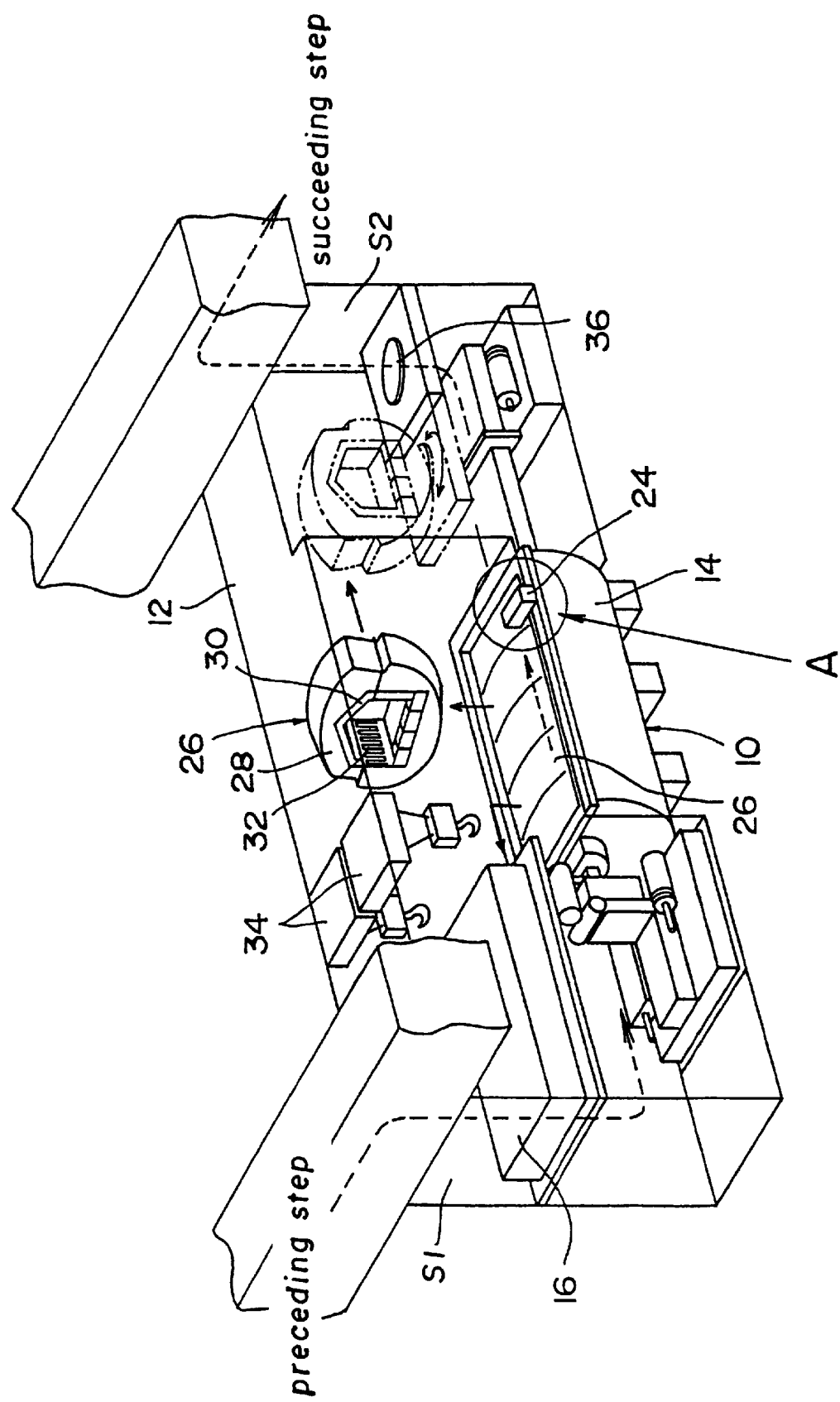
FIG. 1 is a view showing the entire construction of one embodiment of a maintenance glove box integrated type continuous sintering apparatus according to the invention.
Figure 2:
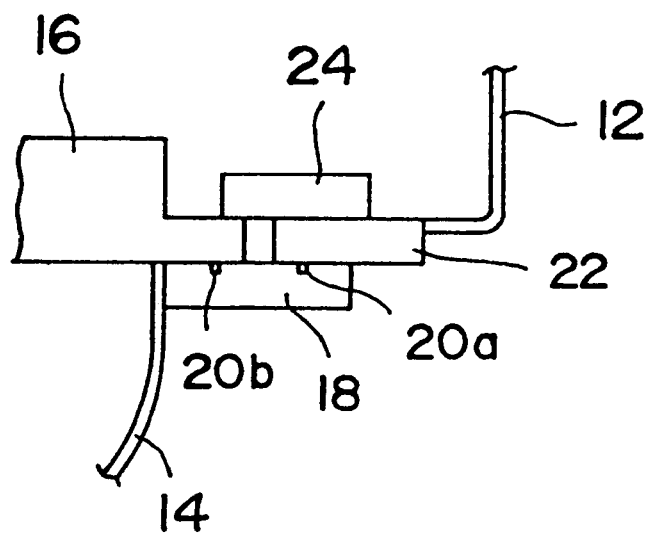
FIG. 2 is an enlarged section showing portion A of FIG. 1 with a ceiling cover being mounted.

FIG. 1 is a view showing the entire construction of one embodiment of a maintenance glove box integrated type continuous sintering apparatus according to the invention, and FIG. 2 is an enlarged section showing portion A of the entire construction. The shown embodiment is an apparatus for sintering fuel pellets in a process for producing nuclear fuels. This continuous sintering apparatus is provided with an integral structure, in which the upper half of a casing 10 of the continuous sintering furnace is enclosed with a glove box 12 so that the upper portion of the furnace casing 10 is opened, if necessary, in the glove box 12 while retaining the containment thereby to allow replacement of a furnace member or remedy of troubles by glove operations.

The furnace casing 10 comprises a combination of a casing body 14 and a ceiling cover 16 which is removably mounted on the casing body 14. As shown in an enlarged scale in FIG. 2, on a flange 18 extended outward from the upper end of the casing body 14, there is placed through a sealant 20a a mounting portion 22 which is extended inward from the lower end of the glove box 12, thereby to retain the gas-tightness. The ceiling cover 16 is provided with a structure in which it is placed through a sealant 20b on the flange 18 of the casing body 14 and can be jointed by means of a clamp 24. The entire construction diagram of FIG. 1 presents the state in which the ceiling cover 16 is removed, and the enlarged section of FIG. 2 presents the state in which the ceiling cover 16 is mounted.

The furnace casing 10 is constructed by assembling the furnace member, as divided into a plurality of furnace member units 26, into the casing body 14. Each furnace member unit 26 is constructed to include a cylindrical cage 28 enveloping the outside, insulating bricks 30 stacked in the inside, and heaters 32 positioned on two opposite side faces inside of the insulating bricks 30. These furnace member units 26 are arrayed in a row to have their center axes aligned inside of the casing body 14 so that the sintered bodies may pass through the space formed at the center thereof and may be sintered during the passage by the heat of the heaters 32. The heaters 32 are made of meandering heat elements and have to be able to be connected/disconnected between the individual furnace member units. Therefore, the individual furnace member units are equipped with respective independent heaters which are supplied alternatively with different electric power of different lines so that their temperatures can be separately controlled. Thus, the power supply of each furnace member unit under consideration may be disconnected from the electrodes when the individual furnace member units are delivered from the casing body, and may be connected with the electrodes when it is to be assembled in the casing body.

In the glove box 12, there is mounted a ceiling crane 34 for hoisting and moving the ceiling cover 16, the furnace member units 26 and so on. In the glove box 12, on the other hand, there are provided a ceiling cover tentative space S1 (i.e., a space in which the ceiling cover is placed, as shown in FIG. 1) for placing the removed ceiling cover 16 tentatively, and a maintenance working space S2. This working space S2 is equipped with a turntable 36 for placing the delivered furnace member unit 26 (as indicated by double-dotted lines). The turntable 36 is provided with a structure in which it cannot only turn in a horizontal place but also move horizontally as a whole in the glove box or vertically, if necessary, so that a component of the furnace member unit placed thereon may be easily repaired or replaced by using gloves attached to the glove box.

It is needless to say, although not described, that the furnace casing is equipped, in addition to the aforementioned facilities, with various facilities necessary for ordinary sintering operations (e.g., apparatus for feeding, transferring and taking out the sintered bodies, and atmosphere adjusting facilities) as in the prior art.

Maintenance is achieved by the following procedure. The clamp 24 is moved, and the ceiling cover 16 is lifted and carried to the tentative space S1 by using the ceiling crane 34 which is placed in the upper portion of the glove box 12. Thus, the furnace casing is opened so that the furnace member units 26 can be taken out from the inside of the furnace casing. The furnace member unit 26 to be maintained is taken out and moved to the maintenance working space S2 by using the ceiling crane 34. The furnace member unit 26 is then placed on the turntable 36. Turntable 36 not only can turn freely in the horizontal plane but also can move in the horizontal plane so that the furnace member unit 26 to be maintained is moved to a position for easy glove operations and is directed in a direction for easy glove operations and is maintained or repaired by replacing it. The components necessary for this maintenance or repair are delivered in/out by the bag-in/bag-out method by using the glove box 12. When maintenance of furnace member unit 26 is completed, it is returned into the furnace casing by a procedure reverse from the aforementioned procedure, and the continuous sintering apparatus can be run again by closing the ceiling cover 16 and by fastening it with the clamp 24. This makes it unnecessary, unlike the prior art method, to build any greenhouse around the sintering apparatus and for the worker wearing protective cloths to enter the greenhouse and work therein.

The ordinary operations of the continuous sintering apparatus are basically similar to those of the prior art. The pellets before sintered are delivered on the dedicated truck from the preceding step into the entrance of the glove box and are carried on a tray through the furnace casing. The pellets are sintered, while passing through the furnace casing, and the sintered pellets are sequentially delivered to the exit of the glove box and transferred on the dedicated truck to the succeeding step.

INDUSTRIAL APPLICABILITY

Since the maintenance glove box is integrated with the continuous sintering furnace, according to the invention, as described hereinbefore, the furnace casing can be partially opened while retaining containment, thereby to make it unnecessary to install the greenhouse or to perform troublesome operations in a protective wear, unlike the prior art. In the invention, moreover, the furnace member is divided into the plurality of furnace member units which can be individually removed, so repair and maintenance operations in the event of a problem can be improved to shorten the time period necessary for such operations. Since it is unnecessary, unlike the prior art, to install/disassemble a greenhouse, the time period therefor can be eliminated to reduce the time for such operation and to reduce the space required for installing the continuous sintering apparatus.

Further, since the inside of the furnace can be easily confirmed, if necessary, for periodic inspections, the invention is effective from the standpoint of preventive maintenance.

We claim:

1. A maintenance glove box integrated type continuous sintering apparatus characterized in that: a casing of a continuous sintering furnace is integrally constructed to have an upper portion enclosed in a maintenance glove box; said furnace casing includes a casing body and a ceiling cover removably mounted on said casing body; said ceiling cover can be opened in said glove box while maintaining the containment; a furnace member to be accommodated in said casing body comprises a combination of a plurality of divided furnace member units; and said furnace member units can be maintained by glove operations when they are delivered out by opening the ceiling cover from the inside of the casing body into the glove box.

2. A maintenance glove box integrated type continuous sintering apparatus as set forth in claim 1, characterized in that: each of said furnace member units includes a cylindrical cage enveloping the outer side, insulating bricks and heaters enveloped by said cage; and said plurality of furnace member units are so arrayed inside of the furnace casing as to have their center axes aligned.

3. A maintenance glove box integrated type continuous sintering apparatus as set forth in claim 1, characterized in that: a ceiling crane is disposed at an upper portion of the inside of the glove box; a ceiling cover tentative space for placing the removed ceiling cover tentatively and a maintenance working space are provided in the glove box; and a turntable for placing the delivered furnace member unit is disposed in said maintenance working space.

4. A maintenance glove box integrated type continuous sintering apparatus as set forth in claim 1, characterized in that: a ceiling crane is disposed at an upper portion of the inside of the glove box; a ceiling cover tentative space for placing the removed ceiling cover tentatively and a maintenance working space are provided in the glove box; and a turntable for placing the delivered furnace member unit is disposed in said maintenance working space.

* * * * *